Nov. 6, 1951     W. A. ABEGG     2,574,081

PIPE JOINT

Filed April 18, 1949

INVENTOR.
WALTER A. ABEGG

BY *James W. Abbott*

ATTORNEY

Patented Nov. 6, 1951

2,574,081

UNITED STATES PATENT OFFICE 2,574,081

PIPE JOINT

Walter A. Abegg, Los Angeles, Calif.

Application April 18, 1949, Serial No. 88,166

11 Claims. (Cl. 285—146)

1

This invention relates to oil well drilling equipment and particularly pertains to a pipe joint.

In drilling operations it is common practice to support and rotate an oil well drill by a tubular drill string which is made up of a plurality of connected lengths of drill pipe temporarily coupled together. It is also common practice to circulate drilling fluid through the string of pipe and it is therefore necessary to maintain the coupling tight even though wear takes place between the coupling element and the lengths of drill string which are to be coupled. It has also been found by practice that the elements performing the coupling operation may become worn loose, in which event it is desirable to recondition the coupling elements so that the pipe can be salvaged.

It is the principal object of the present invention therefore to provide a method of reconditioning drill pipe and a coupling element which may be easily attached and replaced with relation to sections of drill pipe and which cooperate with a coupling sleeve to produce a tight seal at the drill string joint.

The present invention contemplates the use of a threaded coupling adapted to simultaneously receive the threaded ends of swaged drill pipe and which will act when in position to form a tight seal between the coupling and the ends of the drill pipe as well as form a tight seal between the ends of the coupling and the tapered swaged portions of the drill pipes.

The invention is illustrated by way of example in the accompanying drawings in which.

Figure 1:
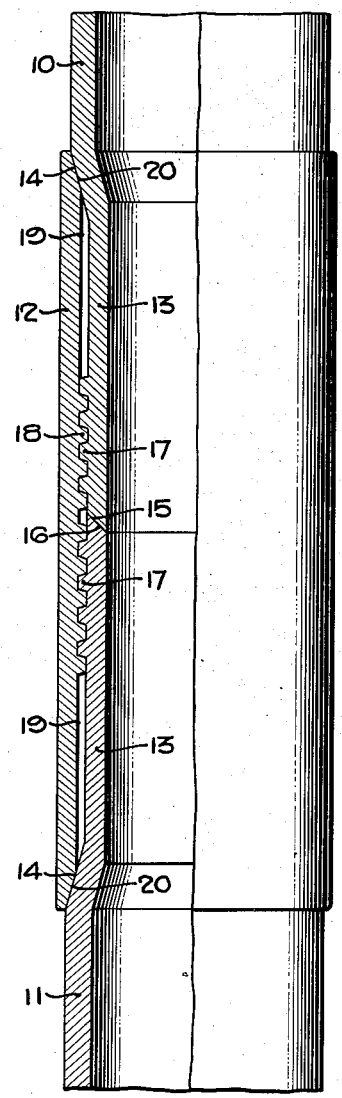
Figure 1 is a fragmentary view in longitudinal section showing a simple form of the present invention embodying the use of a straight coupling as applied to the swaged contiguous ends of drill pipe sections.

Referring more particularly to Fig. 1 of the drawings, 10 indicates one section of drill pipe and 11 indicates contiguous sections of drill pipe. These pipe sections and swaged ends thereby slightly restricting the fluid passageway through the drill string while partially accommodating

2 the diameter of a coupling 12 so that its end shoulders will not objectionably retard the movement of the pipe up and down a well bore. The swaged ends of the pipe sections thus form reduced cylindrical portions 13 of equal diameters and an inclined face 14 which tapers from the reduced end portions to the main body of the pipe sections. It is intended that the swaged ends of the pipe sections shall abut against each other and in order to make a firm abutting joint one of the reduced end sections 13 is formed with an outwardly inclined face 15 and the other reduced end section is formed with an inwardly inclined face 16. These two faces are of complementary angles and thus fit snugly against each other. Upon the outer circumference of each of the swaged end sections 13 is a length of thread 17. The thread shown in the drawing is of the Acme type. It will of course be understood that other threads might be used as desired, they would however provide adequate strength for the coupling joint. Spanning the joint between the swaged ends of the pipe sections is a coupling 12. It is formed with a length of thread 18 which is complementary to the threaded sections 17 and is of a length designed to accommodate both threaded sections. At the opposite ends of the threaded portion 18, formed within the sleeve 12, are counterbores 19. These insure a space between the wall of the counterbore and the outside diameter of the swaged portions 13. By this arrangement the drill stem will have a desirable amount of flexibility in the area of the joint. The opposite ends of the counterbores 19 are formed with outwardly tapering faces 20 which agree substantially in angularity with the inclined faces 14 formed as part of the swaged portions of the pipe sections 10 and 11. It is pointed out that due to this arrangement there will be a swaged fluid seal between the faces 15 and 16 of the pipe sections and a separate swaged fluid seal between the tapered faces 14 of the pipe and the tapered faces 20 of the coupling. In machining the pipe and the coupling care is taken to insure that the faces 14 and 20 contact each other and are swaged before the coupling is tightened and the faces 15 and 16 abut. In order to facilitate operations it is desirable to connect the coupling 12 with one length of pipe. This is performed preferably by forming a shrink fit between one of the inclined faces 14 of the pipe and one inclined face 20 of the coupling 12. The coupling is then shrunk onto the pipe but these faces and the coupling will be retained on the pipe to act as the boxing of a tool joint while permitting the free threaded end of the other pipe section to act as a pin.

In operation of the drill string it may occur that the threaded connection becomes loose or damaged. In the present invention it is contemplated that the swaged ends of the pipe with their threads are cut off of the pipe and that substitute swaged ends shall be fixed in place upon the remaining length of pipe sections. This eliminates the necessity of an expensive machining operation to true up the swaged end of pipe sections and to re-thread them. The structure used to accomplish the aforementioned result is illustrated particularly in Fig. 2 of the drawings where it will be seen that the pipe sections 10 and 11 have had the swaged end portions 13 thereof removed, after which the ends of the pipe are formed with outwardly inclined end faces 21 and external threaded section 22 cut upon the pipe. The pipe sections 10 and 11 are then in condition to receive substitute swaged ends 23 and 24, respectively. The swaged end 23 is formed with a reduced cylindrical portion 25 and the swaged end 24 is formed with a reduced cylindrical portion 26. The end faces of the portions 25 and 26 are formed with inclined surfaces as indicated at 27 and 28. These surfaces abut and are held in position by a straight coupling 29. Due to the fact that the swaged end 25 is of reduced diameter as compared with the pipe, a tapered face 30 will be formed. On the opposite substitute swaged end 24 a cylindrical face 31 is formed. The straight coupling 29 fits over the cylindrical face 31 and is shrunk into position. It will thus be evident that the coupling 29 and the substitute swaged end 24 will in effect provide a box section similar to the one employed on tool joints. The opposite end of the coupling 29 is tapered as indicated at 32 and will fit against the tapered face 30 of the swaged end 23. A central bore is formed entirely through the coupling 29 and includes opposite, smooth straight walls 33 and 34 and an intermediate threaded length 35. The threaded length engages threads 36 and 37 formed on the exterior face of the reduced portions 25 and 26 of the substitute swaged ends. The substitute swaged ends are each formed with a counterbore portion 38 terminating in an inclined face 39 against which the inclined faces 21 of the drill pipe sections abut. Formed interiorly of the counterbores 38 adjacent the inclined faces 39 are threads 40 which are complementary to the threads 22 upon the drill pipe sections. Annular grooves 41 are cut in the smooth cylindrical walls of the counterbores 38 to receive silver solder by which the substitute swaged ends may be held in position. Due to this arrangement as shown in Fig. 2 it is possible to remove and replace the swaged ends of lengths of drill pipe and thereafter provide a combined tool joint and coupling which will engage the swaged ends and hold the string of pipe in a fluid seal condition.

Figure 2:
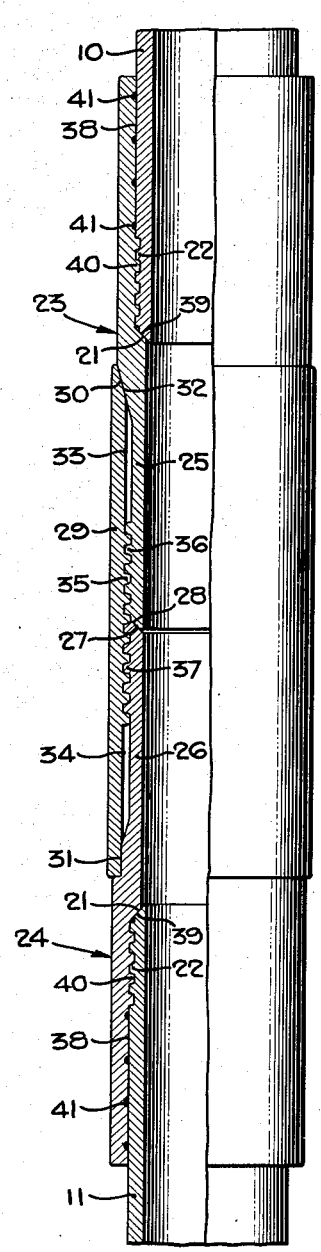
Fig. 2 is a variation of the structure shown in Fig. 1 with separate pipe ends applied to the contiguous ends of two pipe sections.

It is obvious that while the structure shown in Fig. 2 is concerned with substituting swaged ends for those which may be removed from drill pipe, the same construction might be employed in the event that the drill pipe and its tool joint are of the straight hole type. In that event the substitute ends 23 and 24 are not swaged and restricted and the coupling 29 fits over the relatively large diameters of the pipe, which diameters agree with the outside diameter of the drill string.

Figure 3:
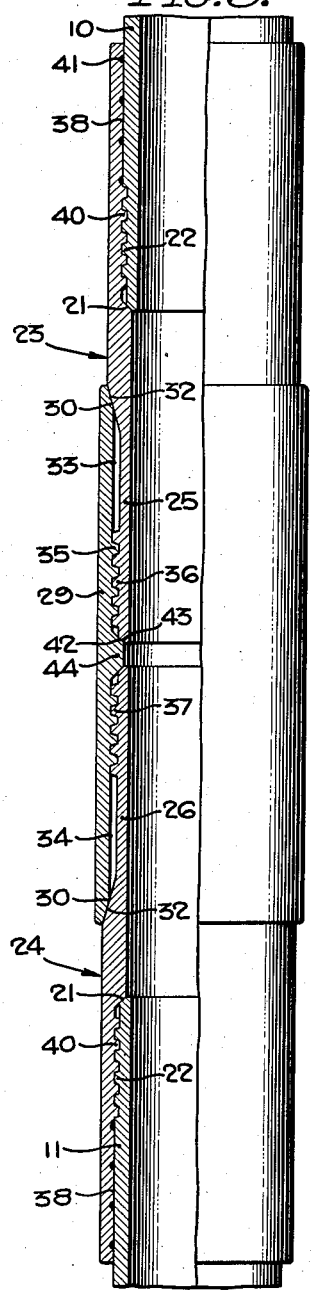
Fig. 3 is a view in central longitudinal section showing a fragmentary portion of a drill string and indicating replaceable swaged pipe ends with the pipe coupling designed to make a fluid seal between the ends of the pipe extensions as well as with the tapered faces of the swaged portions of the pipe extensions.

Referring particularly to Fig. 3 of the drawing it will be seen that a tool joint and pipe structure is provided to receive swaged end pipe and to insure that the ends of the swaged portions form a seal with the coupling itself. In this type of structure the drill pipe sections 10 and 11 are formed with the tapered end faces 21 previously described and are externally threaded at 22. The substitute swaged ends 23 and 24 are fitted over the ends of the pipe sections 10 and 11 and into the counterbores 38. The threads 22 engage threads 40 within the counterbores. In this particular construction the two substitute threaded ends have similar reduced portions 25 and 26 and are each formed with the inclined swaged faces 30 previously described. The reduced portions 25 and 26 are externally threaded as indicated at 36 and 37. These reduced portions do not however terminate in inclined end faces which abut against each other and have complementary angles but terminate in oppositely inclined end faces 42 which abut against the faces 43 formed on an annular shoulder 44. This shoulder occurs midway the length of the coupling 29 and interrupts the length of the threaded section 35 formed in the central bore of the coupling. The coupling is however provided with opposite smooth counterbores 33 and 34 which terminate in inclined faces 32 formed on the coupling. These inclined faces abut against the faces 30 formed on the reduced portions 25 and 26 of the substitute swaged pipe ends. It may be desirable to shrink the coupling 29 on to one of the substitute pipe ends, in which event the coupling will be permanently associated with one of the substitute pipe ends to form a tool joint box and the reduced end portion upon the remaining substitute end will provide a tool joint pin. It will be understood that the substitute ends may be held upon the lengths of pipe 10 and 11 by any suitable means but that the use of silver solder between the outside diameters of the pipe sections 10 and 11 and the counterbores 38 is preferable. Fig. 3 of the drawing shows the combined coupling and tool joint structure adapted for use with replaced swaged ends of drill pipe. Obviously the same structure may be used when it is desirable to replace the damaged ends of straight hole pipes instead of swaged end pipes as shown in the drawing.

In operation of the invention as shown in Fig. 1, it is to be understood that swaged pipe is used. This pipe is provided with reduced ends formed with an external threaded portion, preferably of the Acme thread type. The contiguous ends of the reduced portions are tapered as indicated at 15 and 16 so that they will abut against each other. This may be new pipe or reconditioned pipe. In either event coupling 12 is threaded onto the reduced end portion 13 and its tapered face 20 will then be tightened against the swaged shoulder 14 of the pipe section 11. If desired the coupling may be shrunk onto the shoulder portion so that after it is threaded into place and shrunk to fit it will be rigid and will provide a box section of a tool joint. The opposite end of the coupling 12 may receive the reduced end portion 13 of the pipe 10 so that the reduced swaged end 13 of the pipe 10 will serve the purpose of a pin of a tool joint and its thread 17 may be threaded into engagement with the thread 18 of the coupling. When the pin portion is tightened within the coupling the end faces 15 and 16 of the drill pipe sections 10 and 11 are drawn against each other and at the same time the swaged shoulder 15 is drawn against the tapered face 20 at the end of the coupling. A drill pipe section 10 will then be held temporarily in a fixed position relative to the pipe 11. Attention is directed to the fact that the joint between the faces 15 and 16 will occur midway the length of the thread 18 and that the opposite ends of the coupling will be held with the inclined faces 14 and 20 in a wedged position. This insures that there will not be a possibility of leakage through the joint occurring between the abutting ends of the drill pipe 10 and 11, and the fluid seal formed between the faces 14 and 20 will further resist internal fluid pressure as well as resist the pressure of the hydrostatic head of fluid within which the tool joint is submerged. It will of course be recognized that there will be no possibility of fluid leakage through the joint at the end of the coupling which is shrunk onto the swaged shoulder 14.

In the form of the structures shown in Figs. 2 and 3 a new tool joint has been provided to connect contiguous ends of swaged or straight hole drill pipe upon which the elements of the tool joint have been damaged or objectionably worn. In either of the constructions shown in Figs. 2 and 3 the ends of the pipe carrying the tool joint have been removed preferably by severing the pipe by the use of a torch applied near the tool joint or damaged section. In the form of the invention shown in Fig. 2 substitute ends are provided, the abutting end faces of which have complementary bevels as indicated at 27 and 28. In the form of the invention shown in Fig. 3 the substitute ends 23 and 24 are each formed with a bevel 42 which is complementary to the bevel faces 43, two of which are formed upon opposite sides of the shoulder 44 which is formed within the coupling 29.

It will be seen from the foregoing description that a method of reconditioning drill pipe and tool joints is provided as well as a coupling therefor which makes it possible to easily salvage drill pipe and to provide a coupling or tool joint therefor, both of which are simple in construction and may be easily applied and thereafter used with the same efficiency as was obtained by the pipe sections before reconditioning.

While I have shown the preferred method of reconditioning drill pipe and the preferred coupling construction for carrying out said method it is to be understood that various changes might be made in the steps of method or the construction of the coupling or tool joint by those skilled in the art without departing from the spirit of the invention as claimed.

Having thus described my invention, what I claim and desire to secure by Letters Patent is:

1. A tool joint for reconditioning drill pipe sections of the swaged type in which the ends of the drill pipe have been removed and external threads have been cut thereon, said tool joint structure comprising substitute swaged end sections each of which is formed at one end with a counterbore, a portion of the wall thereof being threaded and another portion being relatively smooth, the opposite end of each of said end sections being swaged to a reduced diameter and formed with an external thread thereon and a tapered swaged shoulder, and a tubular coupling having a central bore which is threaded for a length intermediate its ends to simultaneously engage the threads on the swaged end portions, the opposite end walls of said bore being tapered to conform to the swaged tapered portions of the substitute pipe ends, whereby when the end faces of the substitute pipe ends abut, the tapered faces of the swaged end portions will abut against the tapered faces at the ends of the bore of the coupling collar.

2. A tool joint for reconditioning pipe sections of the swaged type, the ends of said pipes being externally threaded and their end faces being beveled outwardly, said tool joint comprising swaged substitute ends formed with a counterbore at their large ends of a diameter to receive the end of the pipe and being internally threaded to engage the threads of the pipe, a tapered shoulder being formed at the bottom of the counterbore and against which the beveled end of the pipe rests, the opposite swaged ends of the substitute pipe sections being reduced in diameter and being externally threaded, the abutting end faces of the substitute end sections being beveled at complementary angles and each of the swaged end sections being formed with an external tapered shoulder, and a tubular coupling collar internally threaded throughout an intermediate length of the coupling to simultaneously receive the threads of contiguous ends of the substitute pipe sections, the outer ends of the bore through the coupling collar being tapered to abut against tapered faces of the substitute pipe sections whereby said faces will engage substantially simultaneously with the abutment of the complementary end faces of the substitute pipe sections with each other.

3. A tool joint for reconditioning pipe sections of the swaged type, the ends of said pipes being externally threaded and their end faces being beveled outwardly, said tool joint comprising swaged substitute ends formed with a counterbore at their large ends of a diameter to receive the end of the pipe and being internally threaded to engage the threads of the pipe, a tapered shoulder being formed at the bottom of the counterbore and against which the beveled end of the pipe rests, the opposite swaged ends of the substitute pipe sections being reduced in diameter and being externally threaded, the abutting end faces of the substitute end sections being beveled at complementary angles and each of the swaged end sections being formed with an external tapered shoulder, and a tubular coupling collar internally threaded throughout an intermediate length of the coupling to simultaneously receive the threads of contiguous ends of the substitute pipe sections, the outer ends of the bore through the coupling collar being tapered to abut against tapered faces of the pipe substitutes whereby said faces will engage substantially simultaneously with the abutment of the complementary end faces of the substitute pipe sections with each other, one end of the coupling collar being fixed to one end of a substitute pipe section.

4. A tool joint for reconditioning pipe sections of the swaged type, the ends of said pipes being externally threaded and their end faces being beveled outwardly, said tool joint comprising swaged substitute ends formed with a counterbore at their large ends of a diameter to receive the end of the pipe, each counterbore being internally threaded to engage the threads of the pipe and having a smooth portion disposed outwardly from said threads, a tapered shoulder being formed at the bottom of the counterbore and against which the beveled end of the pipe rests, the opposite swaged ends of the substitute pipe sections being reduced in diameter and being externally threaded, the abutting end faces of the substitute end sections being beveled at complementary angles and each of the swaged end sections being formed with an external tapered shoulder, and a tubular coupling collar internally threaded throughout an intermediate length of the coupling to simultaneously receive the threads of contiguous ends of the substitute pipe sections, the outer ends of the bore through the coupling collar being tapered to abut against tapered faces of the pipe substitutes whereby said faces will engage substantially simultaneously with the abutment of the complementary end faces of the substitute pipe sections with each other, the smooth lengths of the substitute pipe sections being soldered in position upon a smooth portion of the pipe sections.

5. A tool joint for connecting two aligned lengths of drill pipe and comprising tubular end sections each of said end sections decreasing in diameter to provide a short, annular external shoulder, the portion of said section between said shoulder and the end thereof having substantially uniform internal and external diameters and being of a length exceeding said external diameter, and having an external thread confined to substantially the endmost half of said end portion of said section, said end portions having matching end faces formed to provide a seal when pressed together, and a tubular coupling having substantially uniform internal and external diameters and a length of matching internal thread extending inward from said internal diameter in a medial zone thereof the length of which substantially equals the combined axial lengths of said external threads, the ends of said coupling being shaped to engage said shoulders when said end sections are screwed into said coupling with said end faces in sealing relation, to form a co-axial tension-compression couple between said coupling and said end sections, said coupling being spaced outwardly out of contact with said end sections between said threads and said shoulders.

6. A combination as in claim 5 in which one of said shoulders has an annular notch formed therein with a cylindrical external face, and the corresponding end of said coupling has an internal cylindrical surface which matches and fits over said face with that end of the coupling set against the back wall of said notch when the tool joint is tightened as aforesaid.

7. A combination as in claim 6 in which said corresponding end of said coupling is permanently united with the end section having said annular notch when assembled therewith as aforesaid.

8. A combination as in claim 5 in which said shoulders are tapered and said coupling ends are shaped to fit said tapered shoulders.

9. A tool joint for connecting two aligned lengths of drill pipe and comprising tubular end sections which have relatively thin cylindrical walls of uniform thickness, an end portion of each of said sections being provided with an external thread, each such section also having an annular shoulder extending outwardly therefrom and spaced from said threads a distance not substantially less than the axial length of said threads, and a cylindrical tubular coupling with a relatively thin wall of substantially uniform thickness and having internal threads in a medial zone thereof, said internal threads matching said external threads for threaded engagement therewith, the opposite ends of said coupling engaging the shoulders of said end sections to place substantial end portions of said coupling under compression and corresponding portions of said end sections under tension when said end sections are screwed tightly into said coupling, said portions of said end sections and said coupling being separated by annular empty spaces lying therebetween when said tool joint is thus assembled.

10. A combination as in claim 9 in which said end sections are provided with annular matching end faces which are adapted to be brought into sealing engagement when said tool joint is assembled as aforesaid.

11. A combination as in claim 9 in which said coupling has the internal threads thereof divided centrally by an internal annular shoulder provided with opposed bevelled sealing faces, said end sections terminating in annular bevelled faces which match the faces on said internal shoulder and engage the latter to form a seal between said coupling and the ends of said sections when said tool joint is assembled as aforesaid.

WALTER A. ABEGG.

REFERENCES CITED

The following references are of record in the file of this patent:

UNITED STATES PATENTS

| Number | Name | Date |
| --- | --- | --- |
| 243,608 | Patterson | June 28, 1881 |
| 1,517,428 | Jahraus | Dec. 2, 1924 |
| 1,817,808 | Eaton | Aug. 4, 1931 |
| 1,992,815 | Craney | Feb. 26, 1935 |
| 2,050,728 | Ost | Aug. 11, 1936 |
| 2,053,808 | Young | Sept. 8, 1936 |
| 2,234,957 | Boynton | Mar. 18, 1941 |
| 2,471,759 | Lowvey | May 31, 1949 |